Samuel E. Lockwood,
Upsetting & Punching Machine.
75032

PATENTED MAR 3 1868

Witnesses

Inventor
Samuel E. Lockwood

United States Patent Office.

SAMUEL E. LOCKWOOD, OF WESTBURY, NEW YORK.

Letters Patent No. 75,032, dated March 3, 1868.

---

COMPOUND PUNCHING AND UPSETTING-APPARATUS.

---

The Schedule referred to in these Letters Patent and making part of the same.

---

TO ALL WHOM IT MAY CONCERN:

Be it known that I, SAMUEL E. LOCKWOOD, of Westbury, in the county of Cayuga, and State of New York, have invented a new and improved Upsetting and Punching-Machine; and I do hereby declare that the following is a full, clear, and exact description thereof, which will enable those skilled in the art to make and use the same, reference being had to the accompanying drawings, forming part of this specification.

The object of this invention is to furnish a machine which shall enable blacksmiths and others to upset wagon-tires or bars of iron or steel, punch holes in the same, or in plates of metal, and also gum saws; and the invention consists in an arrangement of gripes, by which the tire or other article is held when being upset, and in operating a head-block, which is given a lateral motion by an eccentric for upsetting, punching, and gumming saws, as will be hereinafter more fully described.

Similar letters of reference indicate corresponding parts.

The moving and operating parts of this machine are made of iron, steel, or other suitable metal, which parts are supported by a frame of wood or iron, as may be deemed best or most desirable.

Figure 1:
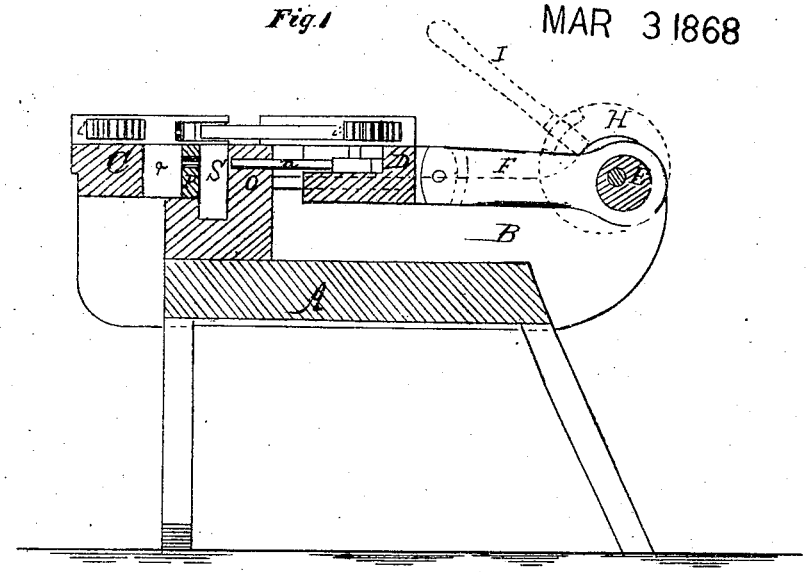
Figure 1 represents a vertical longitudinal section of the machine, showing the general arrangement of parts, the section being through the line $xx$ of fig. 2.
Figure 2:
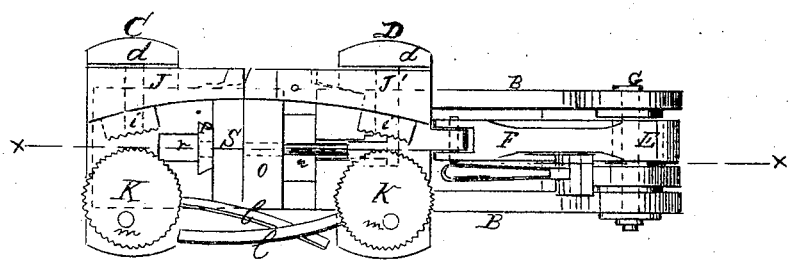
Figure 2 is a top or plan view of the same, showing the position of the gripes and the sliding head.

A represents the frame. B represents the side-plates, to which the eccentric-shaft is attached, and which support the head-blocks of the machine. C represents the stationary head-block, and D is the movable head-block. E is the eccentric, and F is the eccentric-rod, which is attached to the movable head-block D. G is the eccentric-shaft. H is a disk-wheel, which is hung eccentrically on the shaft G, to which the lever I is attached, as seen in the drawing. On each of the heads C and D there are removable blocks J J', whose inner ends are tongued and grooved, so that they fit and guide each other, as J' is moved back and forth on or by the head D. On the face of these blocks there are projecting pieces $i\ i'$, the faces of which are notched or serrated, as seen in the drawing. The blocks J J' are kept in place, when in use, by flanges $d\ d$, on the heads C and D, and by lugs on their bottom sides, which fit into recesses in the heads, but they are easily removed at any time when not in use. K K represent two gripe-wheels with serrated peripheries hung eccentrically to the heads C and D, with levers $l\ l$ attached, as seen in fig. 2, by which they are operated. The pivots on which these wheels K K turn are, seen at $m\ m$.

In upsetting a wagon-tire, (a band or bar or axle of iron or other metal,) the tire or bar is placed horizontally in the machine between the serrated edges of $i\ i'$ and K K, (the head D being slipped back toward the eccentric E.) The gripe-wheels K K are now turned, so as to firmly hold the tire or bar, and the eccentric E is operated by the lever I, forcing the head D thereby toward the stationary head C, and upsetting the tire or bar in the operation. The tire or bar is, of course, heated to a proper temperature before being put in the machine.

$n$ is a punch, which is attached to the sliding head D by a square head on its end, setting in a recess, or in any other suitable manner. O is a block, which is attached to the sides or frame of the machine, through which the punch $n$ passes, it being a guide for the punch. P is a die, which is dove-tailed into the machine, and is removable (as is also the punch) in the usual manner with punching-machines. $r$ is a hole back of the die, through which the punchings or chips drop to the floor. S is a recess or aperture, which passes horizontally through the machine, in which the tire or bar or article to be punched is placed, (against the die.)

The punches and dies may be changed at pleasure, and different sizes and shapes used, which change as to shape would be especially necessary in gumming saws, where the operation would be the same as in punching. The punch in all cases would be operated by the eccentric and lever I, as in upsetting. In punching and gumming saws the blocks J J' would be removed, and the gripe-wheels K K also, if desired.

Having thus described my invention, I claim as new, and desire to secure by Letters Patent—

The improved machine herein described, consisting of the stationary head-block C, sliding head-block D, connecting-rod F, eccentric E, upon shaft G, eccentric-disk H, with its lever I, stationary blocks J, and sliding block J', having serrated projections $i\ i'$, toothed eccentric-wheels $k$, and punch $n$, die-block O, and openings $r$ S, all constructed and arranged as described, for the purposes specified.

SAMUEL E. LOCKWOOD.

Witnesses:
S. E. BISHOP,
D. STONE.